UNITED STATES PATENT OFFICE.

THEODORE DREIDEL, OF CINCINNATI, OHIO.

IMPROVED BLUING-PAPER FOR LAUNDRY PURPOSES.

Specification forming part of Letters Patent No. 70,703, dated November 12, 1867.

*To all whom it may concern:*

Be it known that I, THEODORE DREIDEL, of Cincinnati, Hamilton county, Ohio, have invented a new and useful Bluing-Paper for Laundry Purposes; and I hereby declare the following to be a full, clear, and exact description thereof.

Having dissolved three parts, by weight, pure Bengal or other indigo in one part oil vitriol, I discharge the surplus acid by several washings in cold water until the sour taste is removed and allow the solution to desiccate to the consistence of printer's ink. The pigment thus prepared is then applied to both sides of common white paper, as in ordinary printing—that is to say, by passing the paper through rollers, upon which the pigment has been evenly distributed.

The paper thus prepared, having been well dried, is made up into convenient packages for shipment and use. Fragments of the prepared paper, being applied at the rate of about one square inch to each gallon of water, impart to the latter a very equally-diffused blue tint. Compared to the common powdered form, the above preparation of indigo possesses several marked advantages. The bluing is furnished in more cleanly and convenient form, and free from the expense and waste of the powder; can be applied in the exact quantity desired; blends more equally with the water, without streakiness or loss by precipitation, spillage, &c.

I claim as a new article of manufacture—

The prepared bluing-paper for laundry purposes, substantially as set forth.

In testimony of which invention I hereunto set my hand.

THEODORE DREIDEL.

Witnesses:
GEO. H. KNIGHT,
JAMES H. LAYMAN.